United States Patent
Kim et al.

(10) Patent No.: US 10,936,851 B2
(45) Date of Patent: Mar. 2, 2021

(54) METHOD AND APPARATUS FOR RECOGNIZING OBJECT

(71) Applicant: Samsung Electronics Co., Ltd., Suwon-si (KR)

(72) Inventors: Changhyun Kim, Seongnam-si (KR); Jae Mo Sung, Hwaseong-si (KR); Youngwan Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 16/163,707

(22) Filed: Oct. 18, 2018

(65) Prior Publication Data

US 2019/0205614 A1    Jul. 4, 2019

(30) Foreign Application Priority Data

Jan. 3, 2018   (KR) .................. 10-2018-0000622

(51) Int. Cl.
| | |
|---|---|
| *G06T 7/11* | (2017.01) |
| *G06K 9/00* | (2006.01) |
| *H04N 5/225* | (2006.01) |
| *G06T 5/00* | (2006.01) |
| *G06K 9/40* | (2006.01) |

(52) U.S. Cl.
CPC ..... *G06K 9/00201* (2013.01); *G06K 9/00791* (2013.01); *G06K 9/40* (2013.01); *G06T 5/003* (2013.01); *G06T 7/11* (2017.01); *H04N 5/2256* (2013.01); *G06T 2207/20021* (2013.01); *G06T 2207/30252* (2013.01)

(58) Field of Classification Search
CPC combination set(s) only.
See application file for complete search history.

(56) References Cited

U.S. PATENT DOCUMENTS

| | | | |
|---|---|---|---|
| 7,774,138 B2 | 8/2010 | Matsui | |
| 7,792,380 B2 | 9/2010 | Shiraki et al. | |
| 8,064,643 B2 | 11/2011 | Stein et al. | |
| 8,111,937 B2 | 2/2012 | Dowski, Jr. et al. | |
| 8,520,085 B2 | 8/2013 | Chen et al. | |
| 8,827,514 B2 | 9/2014 | Takagaki | |
| 8,830,360 B1 | 9/2014 | Burt et al. | |
| 9,030,528 B2 | 5/2015 | Pesach et al. | |
| 9,035,796 B2 | 5/2015 | Pilutti et al. | |
| 9,221,461 B2 | 12/2015 | Ferguson et al. | |
| 9,233,688 B2 | 1/2016 | Clarke et al. | |

(Continued)

FOREIGN PATENT DOCUMENTS

| | | |
|---|---|---|
| JP | 2009-118134 A | 5/2009 |
| JP | 2014-56057 A | 3/2014 |

(Continued)

*Primary Examiner* — Omar S Ismail
(74) *Attorney, Agent, or Firm* — Sughrue Mion, PLLC

(57) ABSTRACT

Disclosed is a method and apparatus for recognizing an object, the method including determining whether an image comprises a blur, determining a blur type of the blur based on control information of a vehicle, in response to the image comprising the blur, selecting a de-blurring scheme corresponding to the determined blur type, de-blurring the image using the selected de-blurring scheme, and recognizing an object in the image based the de-blurred image.

15 Claims, 9 Drawing Sheets

(56) References Cited

U.S. PATENT DOCUMENTS

| | | | | |
|---|---|---|---|---|
| 2006/0271286 A1* | 11/2006 | Rosenberg | G01C 21/3647 | 701/431 |
| 2007/0008182 A1* | 1/2007 | Miyahara | G06K 9/00805 | 340/937 |
| 2008/0137982 A1 | 6/2008 | Nakajima | | |
| 2009/0231465 A1 | 9/2009 | Senba | | |
| 2011/0044554 A1 | 2/2011 | Tian et al. | | |
| 2011/0286681 A1* | 11/2011 | Ben-Ezra | G06T 5/50 | 382/255 |
| 2012/0083982 A1 | 4/2012 | Bonefas et al. | | |
| 2012/0200708 A1* | 8/2012 | Fukuda | B60Q 9/002 | 348/148 |
| 2013/0241747 A1* | 9/2013 | Hatakeyama | G08G 1/166 | 340/901 |
| 2013/0258488 A1* | 10/2013 | Hatakeyama | B60K 35/00 | 359/630 |
| 2013/0271616 A1* | 10/2013 | Hirakawa | G06T 5/003 | 348/208.6 |
| 2014/0254951 A1* | 9/2014 | Salvador | G06T 5/003 | 382/255 |
| 2014/0306844 A1 | 10/2014 | Kim | | |
| 2014/0328550 A1 | 11/2014 | Liu et al. | | |
| 2014/0375679 A1 | 12/2014 | Margolis et al. | | |
| 2016/0048952 A1* | 2/2016 | Tezaur | G06T 5/004 | 382/255 |
| 2016/0100160 A1* | 4/2016 | Tsai | H04N 17/002 | 348/187 |
| 2016/0132705 A1* | 5/2016 | Kovarik | G06K 7/10376 | 340/10.3 |
| 2016/0196639 A1 | 7/2016 | Shin | | |
| 2016/0255323 A1* | 9/2016 | Wajs | H04N 9/07 | 348/49 |
| 2017/0345311 A1* | 11/2017 | Sugiura | G08G 1/167 | |

FOREIGN PATENT DOCUMENTS

| | | |
|---|---|---|
| KR | 10-2011-0096882 A | 8/2011 |
| KR | 10-1437920 B1 | 11/2014 |
| KR | 10-2015-0137488 A | 12/2015 |

* cited by examiner

FIG. 1
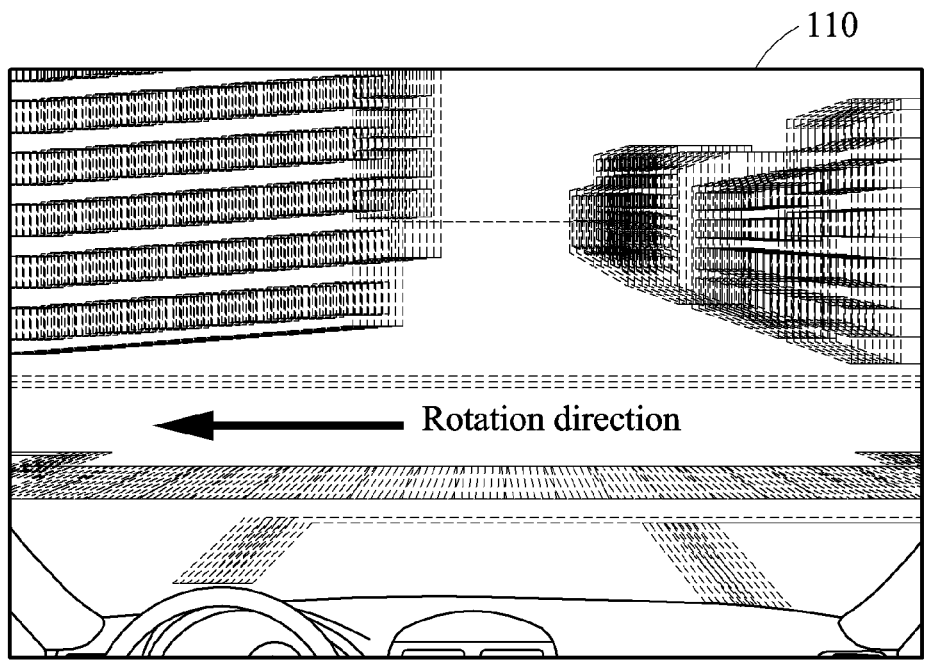
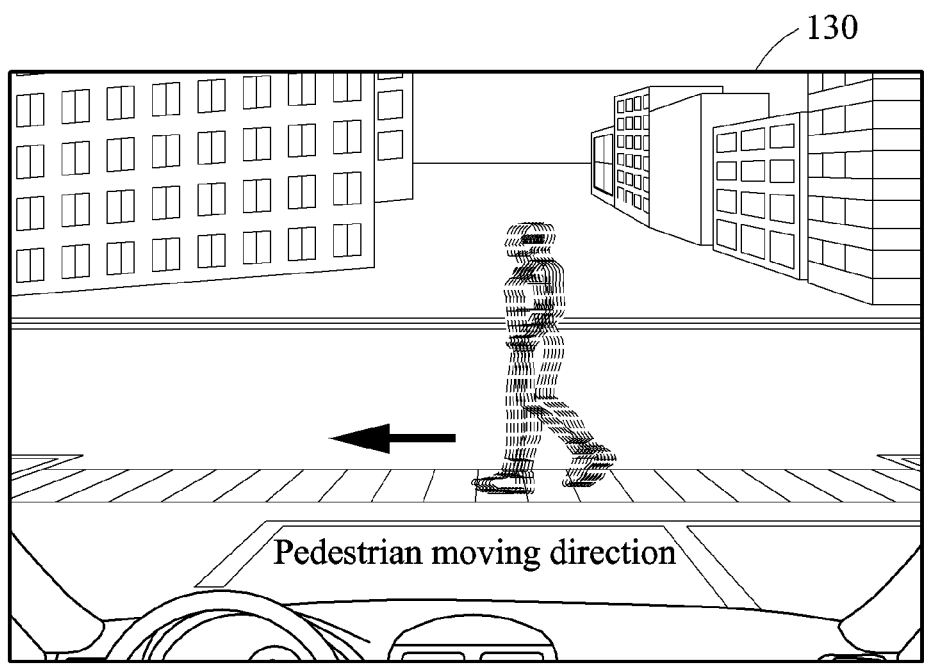

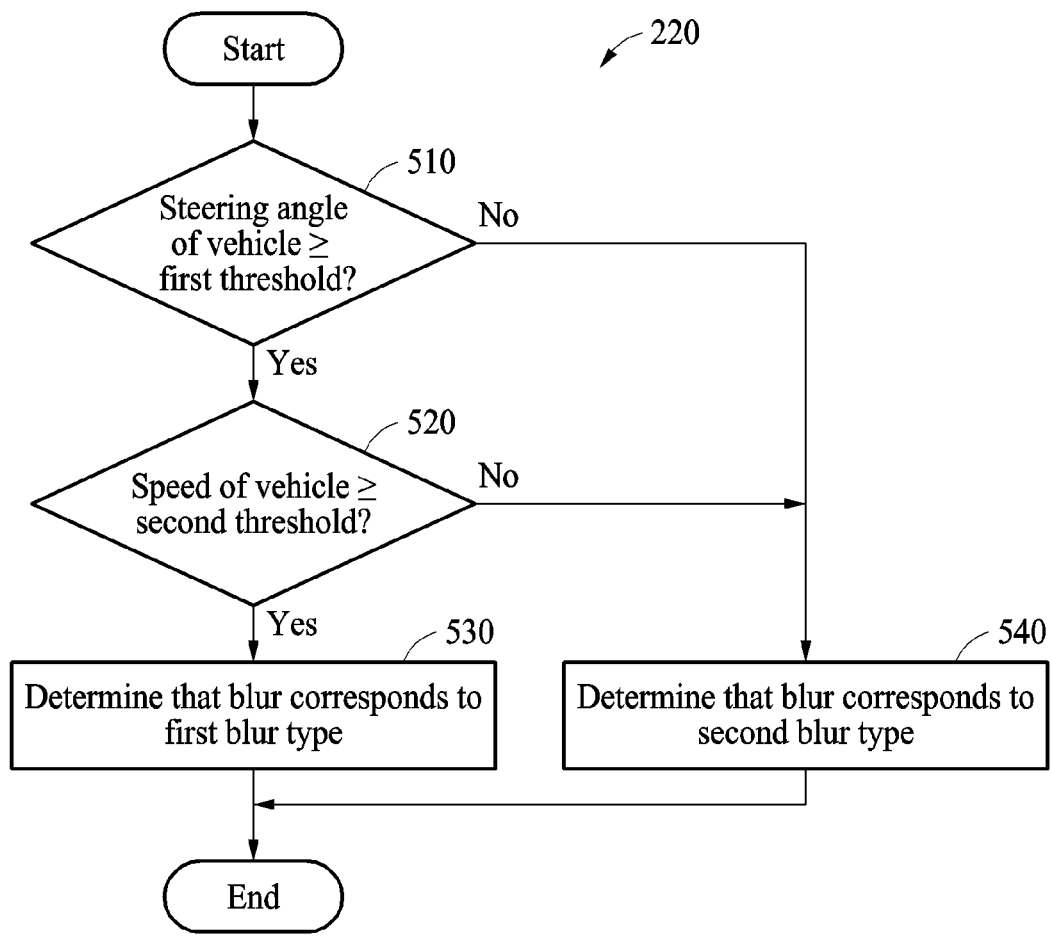

900

METHOD AND APPARATUS FOR RECOGNIZING OBJECT

CROSS-REFERENCE TO RELATED APPLICATIONS

This application claims the benefit under 35 USC § 119(a) of Korean Patent Application No. 10-2018-0000622 filed on Jan. 3, 2018 in the Korean Intellectual Property Office, the entire disclosure of which is incorporated herein by reference for all purposes.

BACKGROUND

1. Field

The following description relates to a method and apparatus for recognizing an object.

2. Description of Related Art

Visual information augmentation technologies are provided to assist steering of a vehicle and other means of transportation. In such technology, various methods are used to extract a lane marking or road information from a driving image.

For example, when a lane marking is obscured by a vehicle, or when there is a change in brightness or contrast in an image due to a change in time from day to night or a change in weather such as snows and rains, it is difficult to accurately detect an object due to an ambiguity of image information. To capture an image at night, an auto exposure sensor is used due to a low illuminance. However, when using the auto exposure sensor, accurate object detection may not be easy due to a blur caused by a dynamically moving vehicle or object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of recognizing an object, the method including determining whether an image comprises a blur, determining a blur type of the blur based on control information of a vehicle, in response to the image including the blur, selecting a de-blurring scheme corresponding to the determined blur type, de-blurring the image using the selected de-blurring scheme, and recognizing an object in the image based the de-blurred image.

The determining of whether the image may include the blur may include determining whether the image may include the blur based on a clearness of an edge portion of the image.

The determining of whether the image may include the blur may include dividing the image into partial images, calculating a gradient magnitude value corresponding to each of the partial images, and determining whether the image may include the blur based on a comparison of the gradient magnitude value and a threshold.

The control information may include any one or any combination of a steering angle of the vehicle, a speed of the vehicle, and whether a turn indicator of the vehicle is operated.

The determining of the blur type may include determining whether the blur corresponds to a first blur type or a second blur type based on any one or any combination of whether a steering angle of the vehicle is greater than or equal to a first threshold, whether a speed of the vehicle is greater than or equal to a second threshold, and whether a turn indicator of the vehicle is operated.

The control information may be acquired by any one or any combination of an odometer, a gyro sensor, a radio detection and ranging (RADAR), a light detection and ranging (LiDAR), an inertial measurement unit (IMU) sensor, and an acceleration sensor.

The selecting of the de-blurring scheme may include selecting a de-blurring scheme using a first filter in response to the blur corresponding to a first blur type, and selecting a de-blurring scheme using a second filter in response to the blur corresponding to a second blur type.

The method may include acquiring an illuminance, using an illuminance sensor, at a time when the image is acquired, wherein the determining of whether the image may include the blur may include determining whether the image may include the blur based on the illuminance.

In one general aspect, there is provided an apparatus for recognizing an object, the apparatus including a processor configured to determine whether an image may include a blur, determine a blur type of the blur based on control information of a vehicle in response to the image including the blur, select a de-blurring scheme corresponding to the determined blur type, de-blur the image using the selected de-blurring scheme, and recognize an object in the image based on the de-blurred image.

The processor may be configured to determine whether the image may include the blur based on a clearness of an edge portion of the image.

The processor may be configured to divide the image into partial images, to calculate a gradient magnitude value corresponding to each of the partial images, and to determine whether the image may include the blur based on a comparison of the gradient magnitude value and a threshold.

The control information may include any one or any combination of a steering angle of the vehicle, a speed of the vehicle, and whether a turn indicator of the vehicle is operated.

The processor may be configured to determine whether the blur corresponds to a first blur type or a second blur type based on any one or any combination of whether a steering angle of the vehicle is greater than or equal to a first threshold, whether a speed of the vehicle is greater than or equal to a second threshold, and whether a turn indicator of the vehicle is operated.

The control information may be acquired by any one or any combination of an odometer, a gyro sensor, a radio detection and ranging (RADAR), a light detection and ranging (LiDAR), an inertial measurement unit (IMU) sensor, and an acceleration sensor.

The processor may be configured to select a de-blurring scheme using a first filter in response to the blur being determined to correspond to a first blur type and to select a de-blurring scheme using a second filter in response to the blur being determined to correspond to a second blur type.

The apparatus may include an illuminance sensor configured to acquire an illuminance at a time when the image is acquired, wherein the processor may be configured to determine whether the image may include the blur based on the illuminance.

Other features and aspects will be apparent from the following detailed description, the drawings, and the claims.

BRIEF DESCRIPTION OF THE DRAWINGS

FIG. 1 illustrates an example of a blur included in an input image.

FIGS. 5 and 6 illustrate examples of a method of determining a blur type.

Figure 2:
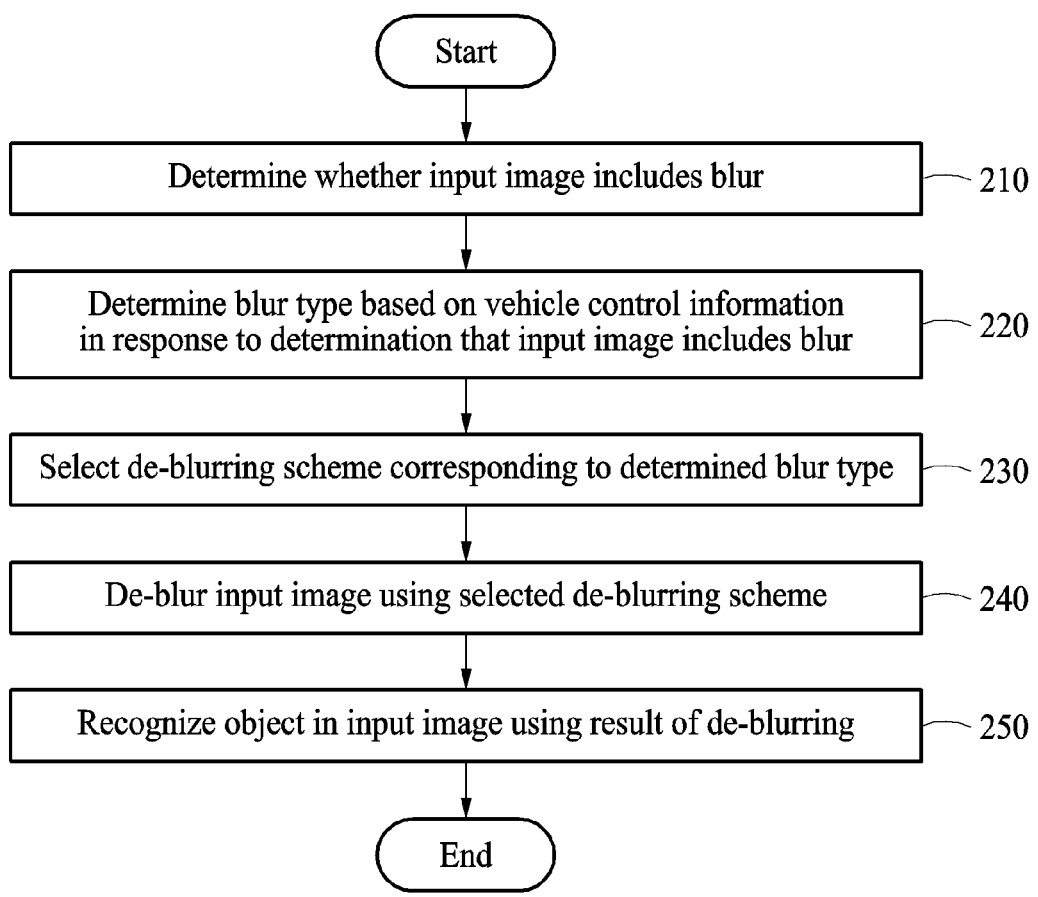
FIG. 2 illustrates an example of a method of recognizing an object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Examples set forth hereinafter may be used to display a virtual route or generate visual information to assist steering of an autonomous vehicle in an augmented reality (AR) navigation system of a smart vehicle. The examples may be used to interpret visual information and assist safe and pleasant driving in a device including an intelligent system such as a head-up display (HUD) installed for driving assistance or fully autonomous driving of a vehicle. The examples may be applied to, for example, an autonomous vehicle, an intelligent vehicle, a smart phone, wearable device, various Internet of Things (IoT) device, security device, robot requiring a positioning operation, and a mobile device.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone.

FIG. 1 illustrates an example of a blur included in an input image. Referring to FIG. 1, an image 110 includes a global blur 110 and an image 130 includes a local blur.

When a vehicle rotates in a direction for example, to, make U-turn or turn left or right, an overall image captured from the vehicle may be blurry due to a horizontal motion of the vehicle. As shown in the image 110, a blur generated in a horizontal and/or vertical direction in the overall image is referred to as 'a global blur' or 'a first blur type'.

When a vehicle is stopped or slowly moving, and when an object corresponding to a target to be captured is moving, an image captured from the vehicle may include a blur in an area of the moving object. As shown in the image 130, a blur generated in a portion of an image or in a local area of an image is referred to as 'a local blur' or 'a second blur type'. The local blur may be generated when a device capturing the image 130 hardly moves and an object or target to be captured is moving. The global blur and the local blur differ in cause and thus, a de-blurring scheme for each cause is required.

FIG. 2 illustrates an example of a method of recognizing an object. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, an apparatus for recognizing an object, hereinafter referred to as a "recognition apparatus", determines whether an input image includes a blur. In terms of the input image, a single input image or a plurality of input images is acquired for each frame. In an example, the input image is acquired using a capturing device mounted on a front side of a vehicle. In an example, the capturing device is attached at a position, such as, for example, a windshield, a dashboard, license plate, license plate holder, and a rear-view mirror of the vehicle to capture a front view from the vehicle. In this example, it is assumed that calibration information of the capturing device is known. The capturing device includes, for example, a mono camera, a vision sensor, an image sensor, or other devices that performs a similar function.

The input image is captured by the capturing device included in the recognition apparatus or an apparatus other than the recognition apparatus. The input image is, for example, the image 110 or the image 130 of FIG. 1. The input image is an image captured at night or an image captured in a daytime.

In operation 210, the recognition apparatus determines whether the input image includes the blur irrespective of whether the blur is the global blur or the local blur. In an example, in operation 210, the recognition apparatus determines whether the input image includes the blur based on a clearness of an edge portion of the input image. In an example, when the clearness of the edge portion of the input image is less than a threshold, the recognition apparatus determines that the input image includes the blur. In an example, the recognition apparatus determines that the input image includes the blur based on a distribution proportion of the edge portion having the clearness less than the threshold. In an example, the recognition apparatus determines whether the input image includes the blur using a gradient magnitude value. A method of determining, by the recognition apparatus, whether the input image includes the blur using the gradient magnitude value will be further described with reference to FIG. 3.

In operation 220, the recognition apparatus determines a blur type of the blur based on vehicle control information in response to a determination that the input image includes the blur. The vehicle control information includes, for example, a steering angle of a vehicle, a speed of the vehicle, whether brakes have been activated, whether gears have been changed, and whether a left or right turn indicator of the vehicle is used. The vehicle control information is acquired by sensors such as, for example, an odometer, a gyro sensor, a radio detection and ranging (RADAR), a light detection and ranging (LiDAR), an inertial measurement unit (IMU) sensor, and an acceleration sensor. The sensors are, for example, sensors 910 of FIG. 9. The recognition apparatus determines whether the blur corresponds to a first blur type or a second blur type.

In operation 220, the recognition apparatus determines a blur type of the blur based on any one or any combination of whether a steering angle of the vehicle is greater than or equal to a first threshold, whether a speed of the vehicle is greater than or equal to a second threshold, whether brakes have been activated, whether gears have been changed, and whether a left or right turn indicator of the vehicle is used. A method of determining the blur type by the recognition apparatus will be further described with reference to FIGS. 4 through 6.

In an example, the recognition apparatus determines the blur type using a direction of a gradient in the input image. As described above, since the global blur is generated due to a motion of a vehicle making U-turn or turning left or right, a gradient occurs in a horizontal direction, that is, an x-axial direction. In an example, since the local blur is generated due to a motion of the vehicle or a pedestrian in front of the vehicle when the vehicle is stopped or driving slowly, the gradient occurs in a vertical direction, i.e., a y-axial direction. In another example, the gradient for the local blur occurs in a horizontal and vertical direction, i.e., x-axial direction and y-axial direction. In an example, when the gradient in the horizontal direction is present in the input image, the recognition apparatus determines that the blur corresponds to the first blur type, for example, the global blur. In an example, when the gradient in the vertical direction is present in the input image, the recognition apparatus determines that the blur corresponds to the second blur type, for example, the local blur.

Also, the recognition apparatus determines the blur type in the input image using an algorithm for locally detecting a motion of an object such as an RGB histogram of a detection box or an optical flow in two consecutive input images.

In operation 230, the recognition apparatus selects a de-blurring scheme corresponding to the determined blur type. When the blur is determined to be the first blur type, the recognition apparatus selects a de-blurring scheme using a first filter. The first filter is a filter that removes the global blur, for example, a motion filter. When the blur is determined to be the second blur type, the recognition apparatus selects a de-blurring scheme using a second filter. The second filter is a filter that removes the local blur, for example, a de-focusing filter.

In operation 240, the recognition apparatus de-blurs the input image using the selected de-blurring scheme. When the blur corresponds to the first blur type, the blur may have a horizontal motion. Thus, the recognition apparatus de-blurs the input image using a motion point spread function (PSF) (convolution filter) corresponding to a one-dimensional basis vector. When the blur corresponds to the second blur type, the blur may have horizontal and vertical motions. Thus, the recognition apparatus de-blurs the input image using a Gaussian PSF (convolution filter).

In operation 240, the recognition apparatus performs de-convolution to de-blur the input image using a selected convolution filter. The recognition apparatus uses various de-convolution schemes, for example, Wiener, Lucy, Regression, and Blind. In an example, the de-convolution scheme is expressed as shown in Equation 1 below.

$$g(x, y) = h(x, y) * f(x, y) \overset{\text{Fourier Transform}}{\leftrightarrow} G(U, V) = H(U, V)F(U, V) \quad \text{[Equation 1]}$$

In Equation 1, g(x, y) denotes a de-convoluted image, i.e., a blurred image in an image domain, h(x, y) denotes a convolution filter in the image domain, and f(x, y) denotes an original image in the image domain. G(U, V) denotes a de-convoluted image, i.e., a blurred image in a Fourier domain, H(U, V) denotes a convolution filter in the Fourier domain, and F(U, V) denotes an original image in the Fourier domain.

In operation 250, the recognition apparatus recognizes an object in the input image using a result of the de-blurring. The recognition apparatus recognizes the object from the de-blurred input image using, for example, a convolution neural network (CNN), a deep neural network (DNN), and a support vector machine trained to recognize an object such as a pedestrian, a vehicle, a lane marking, and a signal light in advance. For example, the CNN is trained to simultaneously verify a type of an object to be detected and a bounding box corresponding to the object to be detected in the (de-blurred) input image.

Figure 3:
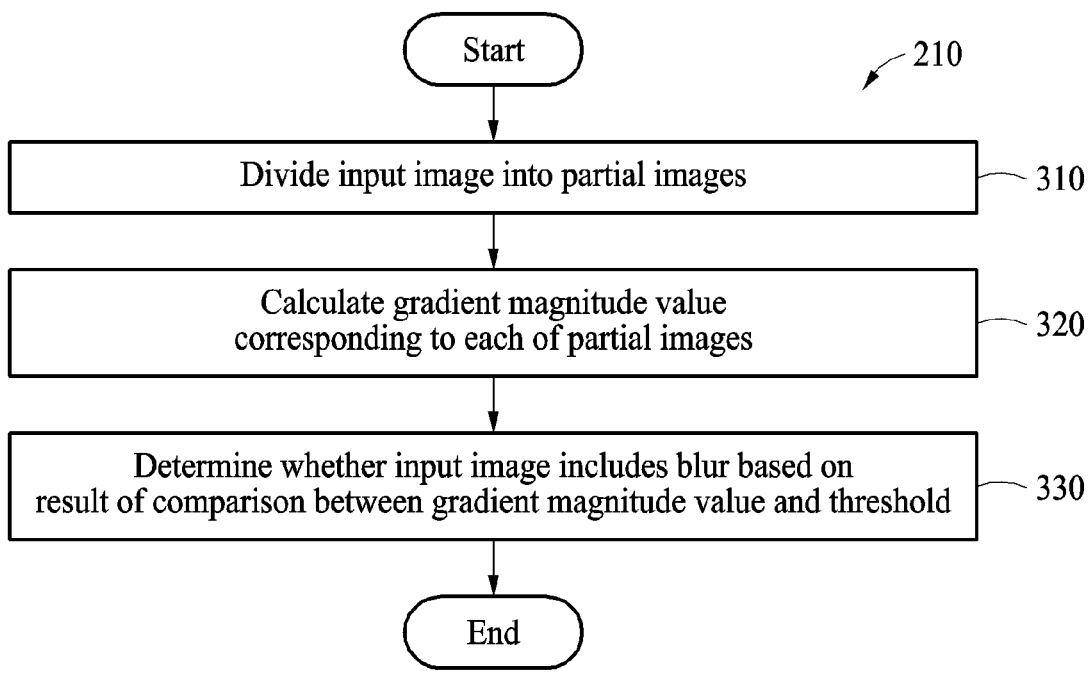
FIG. 3 illustrates an example of a method of determining whether a blur is present.

FIG. 3 illustrates an example of a method of determining whether a blur is present. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a recognition apparatus divides an input image into partial images. For example, the recognition apparatus equally divides the input image into four partial images, each having a ½ height and a ½ width of the input image.

In operation 320, the recognition apparatus calculates a gradient magnitude value corresponding to each of the partial images. The recognition apparatus obtains an X-axial gradient magnitude value and a Y-axial gradient magnitude value from each of the four partial images. The recognition apparatus sorts the X-axial gradient magnitude values and the Y-axial gradient magnitude values in a descending order and defines a median value of an upper 0.1% of the sorted values as a blurriness measure. Thus, eight blurriness measures are defined as the X-axial gradient magnitude values and the Y-axial gradient magnitude values of quadrants.

In operation 330, the recognition apparatus determines whether the input image includes the blur based on a result of a comparison between the gradient magnitude value and a threshold. The recognition apparatus determines that blur has occurred based on, for example, eight blurriness measures (X-axis value and Y-axis value of each quadrant) $Th1\_x$, $Th1\_y$, $Th2\_x$, $Th2\_y$, $Th3\_x$, $Th3\_y$, $Th4\_x$, and $Th4\_y$.

As discussed above, the global blur is generated in the whole image when there is a rotation in a horizontal direction, i.e., an X-axial direction. Also, the local blur is generated in a portion of quadrants of an image, which may lead to X-axial and Y-axial changes.

To include both characteristics of the global blur and the local blur, when one representative blurriness measure obtained from a combination of the eight blurriness measures (the X and Y axis values of each quadrant) is less than a threshold, the recognition apparatus determines that the global blur and the local blur are present. A method of determining a blur type using one representative blurriness measure obtained from a combination of the eight blurriness measures will be further described with reference to FIGS. 4A and 4B.

If the eight blurriness measures $Th1\_x$, $Th1\_y$, $Th2\_x$, $Th2\_y$, $Th3\_x$, $Th3\_y$, $Th4\_x$, and $Th4\_y$ are greater than the threshold, the recognition apparatus determines that the blur is absent.

Figure 4B:
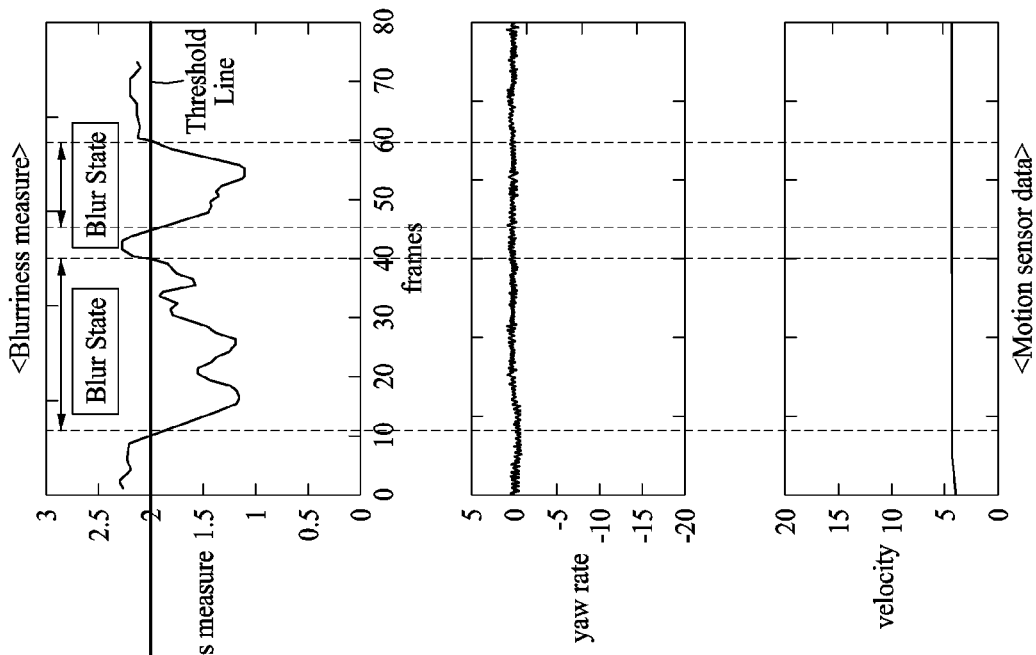
FIGS. 4A and 4B illustrates examples of a method of determining a blur type.
Figure 4A:
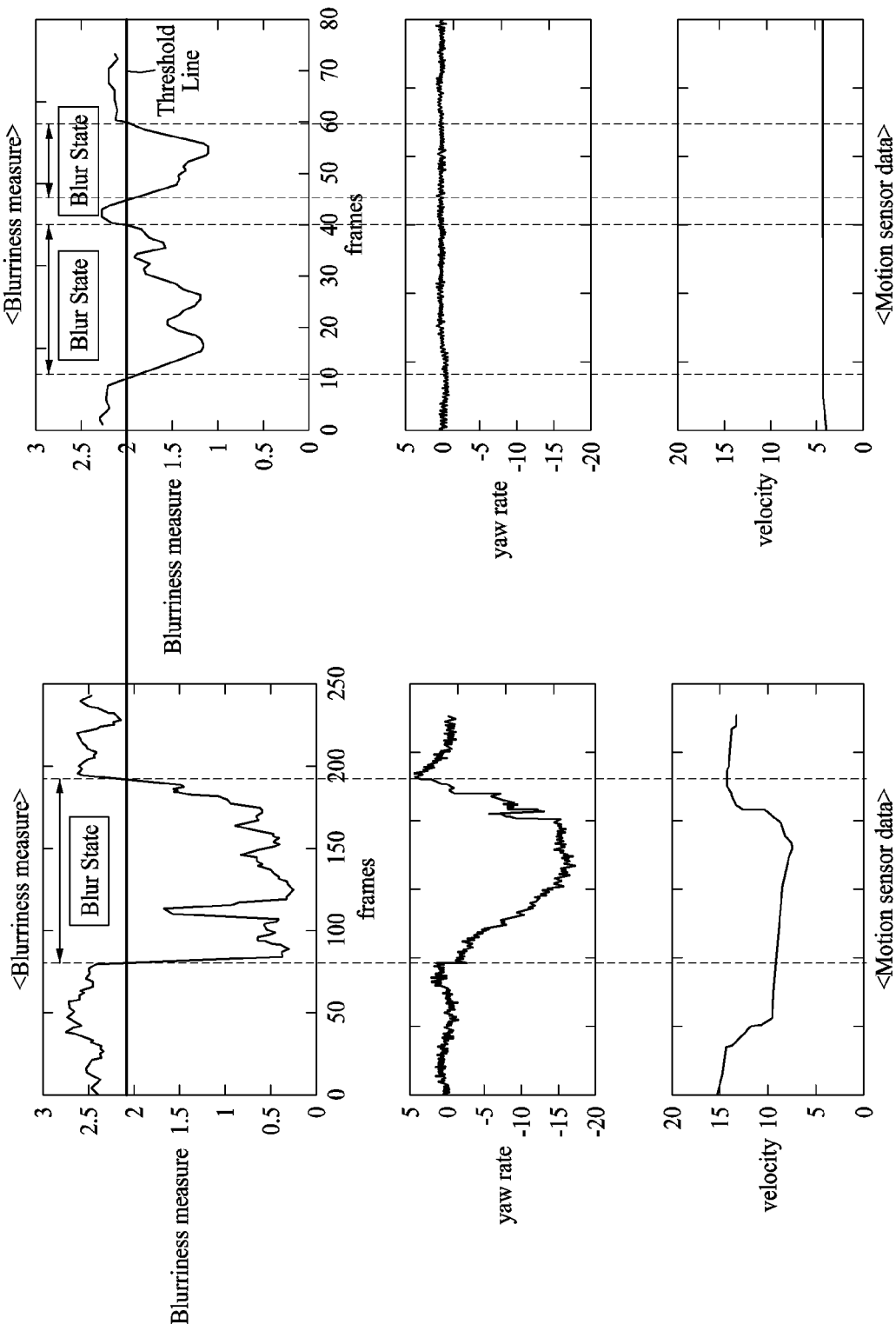

FIGS. 4A and 4B illustrates examples of a method of determining a blur type. FIG. 4A is a graph representing a velocity and a yaw rate sensed by a motion sensor and a blurriness measure in association with a global blur being generated due to, for example, a vehicle making U-turn. FIG. 4B is a graph representing a velocity and a yaw rate sensed by a motion sensor and a blurriness measure in association with a local blur being generated due to, for example, a motion of a pedestrian in front of a vehicle when the vehicle is stopped. The yaw rate indicates, for example, a degree to which a vehicle is swayed horizontally due to a wheel steering angle. The velocity indicates, for example, a change in speed caused by an operation of a brake or an accelerator when a vehicle makes U-turn.

Referring to FIG. 4A, the yaw rate and the velocity change when it is determined that an input image is in a blur state based on the blurriness measure. The term 'blur state' refers to an image being blurry.

Referring to FIG. 4B, the yaw rate and the velocity remains do not change when it is determined that an input image is in a blur state based on the blurriness measure.

A recognition apparatus determines a blur type using a measurement value of a motion sensor or vehicle control information. When the measurement value of the motion sensor, for example motion sensor data changes in the blur state, the recognition apparatus determines a corresponding blur to be the global blur. When the measurement value of the motion sensor does not change in the blur state, the recognition apparatus determines a corresponding blur to be the local blur.

FIG. 5 illustrates an example of a method of determining a blur type. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, a recognition apparatus determines whether a steering angle of a vehicle is greater than or equal to a first threshold. The first threshold is, for example, 20 degrees)(°). When the steering angle of the vehicle is determined to be less than the first threshold in operation 510, the recognition apparatus determines that a blur corresponds to a second blur type in operation 540. For example, when the steering angle is less than 20°, the vehicle may be driving straight ahead instead of making U-turn, or turning left or right. In this example, the blur is generated due to a motion of an object in front of the vehicle instead of a motion of the vehicle. The recognition apparatus determines that the blur corresponds to the second blur type.

When the steering angle of the vehicle is determined to be greater than or equal to the first threshold in operation 510, the recognition apparatus determines whether a speed of the vehicle is greater than or equal to a second threshold in operation 520. The second threshold is, for example, 15 km/s. When the speed of the vehicle is determined to be less than the second threshold in operation 520, the recognition apparatus determines that the blur corresponds to the second blur type in operation 540. For example, when the vehicle rotates in the U-turn or in a left or right direction at a relatively low speed, little or no horizontal motion may occur in the rotating vehicle. In this example, the recognition apparatus determines that the blur corresponds to the second blur type.

When the speed of the vehicle is determined to be greater than or equal to the second threshold in operation 520, the recognition apparatus determines that the blur corresponds to a first blur type in operation 530. For example, when the vehicle rotates in the U-turn or in a left or right direction at a relatively high speed, a horizontal motion may occur in the rotating vehicle. In this example, the recognition apparatus determines that the blur corresponds to the first blur type.

Figure 6:
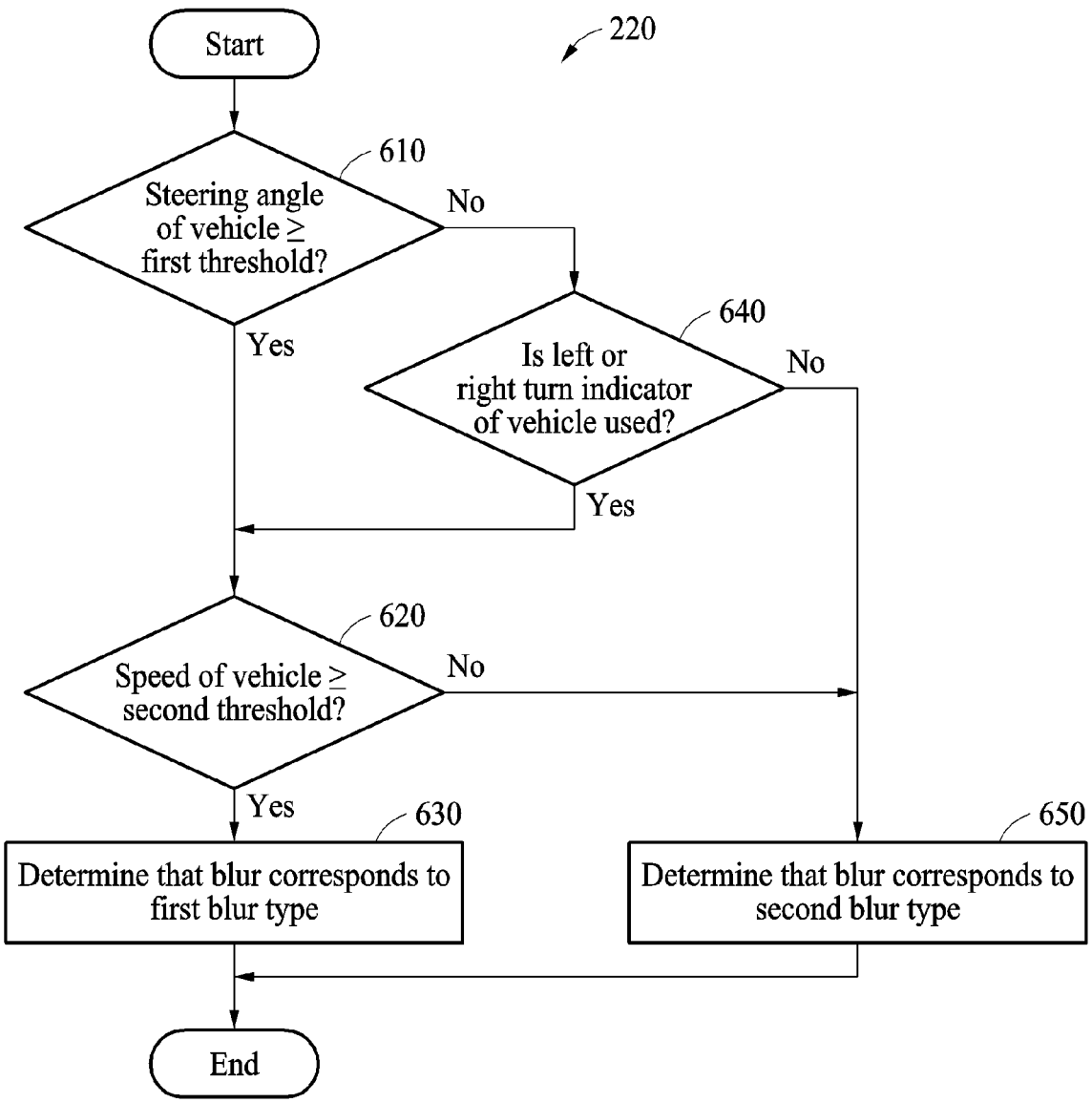

FIG. 6 illustrates an example of a method of determining a blur type. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, a recognition apparatus determines whether a steering angle of a vehicle is greater than or equal to a first threshold. The first threshold is, for example, 20°.

When the steering angle of the vehicle is determined to be less than the first threshold in operation 610, the recognition apparatus determines whether a left or right turn indicator of the vehicle is being operated in operation 640. When it is determined that the left or right turn indicator of the vehicle is not being operated in operation 640, the recognition apparatus determines that a blur corresponds to a second blur type in operation 650. For example, when the steering angle is less than 20°, and when the left or right turn indicator is not used, the vehicle may be driving straight ahead instead of making U-turn, or turning left or right. In this example, the recognition apparatus determines that the blur corresponds to the second blur type.

When it is determined that the left or right turn indicator of the vehicle is being operated in operation 640, the recognition apparatus determines whether a speed of the vehicle is greater than or equal to a second threshold in operation 620. The second threshold is, for example, 15 km/s.

When the speed of the vehicle is determined to be less than the second threshold in operation 620, the recognition apparatus determines that the blur corresponds to the second blur type in operation 650. For example, when the vehicle rotates in the U-turn or in a left or right direction at a relatively low speed, little or no horizontal motion may occur in the rotating vehicle. In this example, the recognition apparatus determines that the blur corresponds to the second blur type. When the speed of the vehicle is determined to be greater than or equal to the second threshold in operation 620, the recognition apparatus determines that the blur corresponds to a first blur type in operation 630. For example, when the vehicle rotates in the U-turn or in a left or right direction at a relatively high speed, a horizontal motion may occur in the rotating vehicle. In this example, the recognition apparatus determines that the blur corresponds to the first blur type.

When the steering angle of the vehicle is determined to be greater than or equal to the first threshold in operation 610, the recognition apparatus determines whether the speed of the vehicle is greater than or equal to the second threshold in operation 620. When the speed of the vehicle is determined to be less than the second threshold in operation 620, the recognition apparatus determines that the blur corresponds to the second blur type in operation 650. When the speed of the vehicle is determined to be greater than or equal to the second threshold in operation 620, the recognition apparatus determines that the blur corresponds to the first blur type in operation 630.

Figure 7:
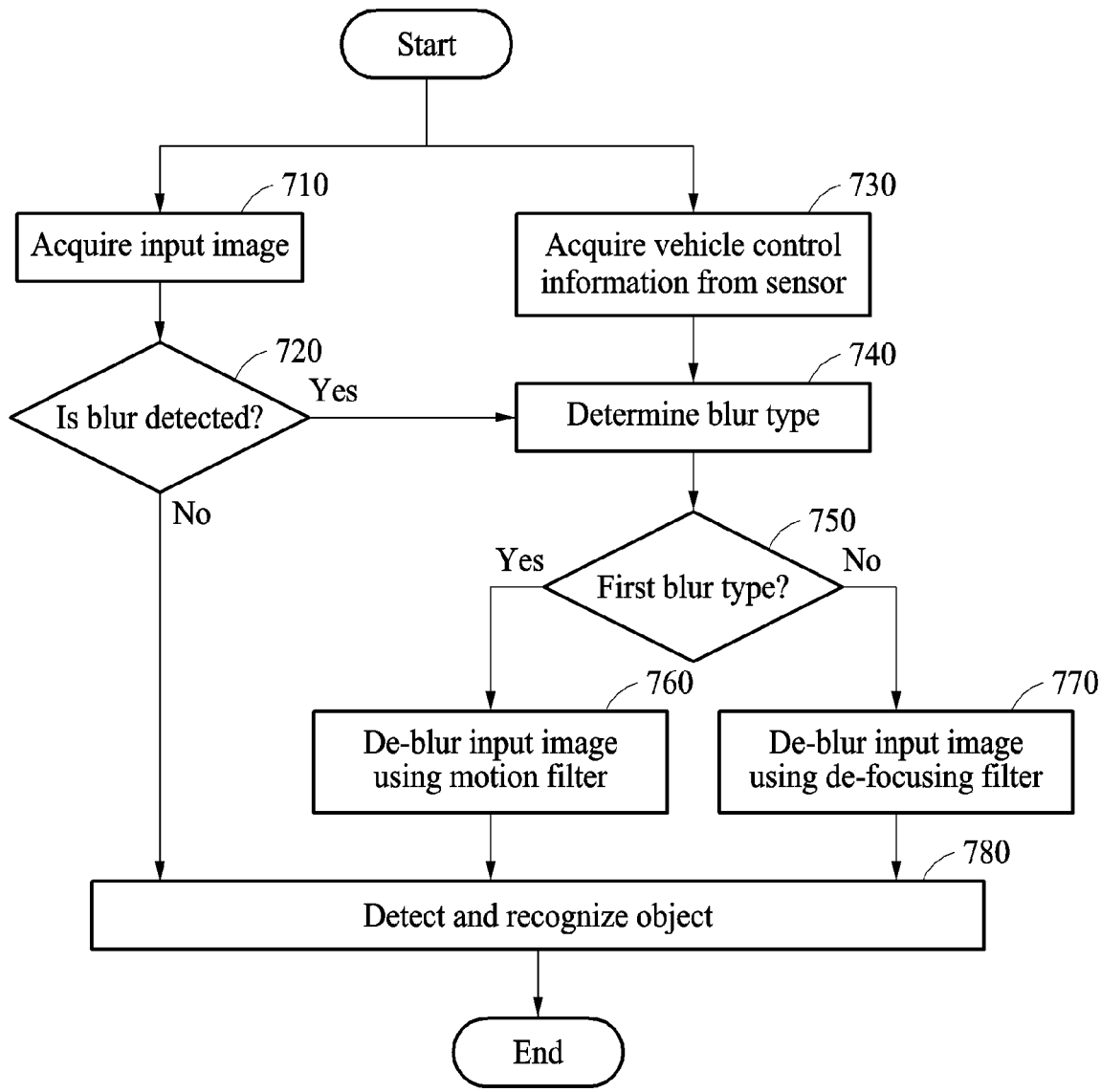
FIGS. 7 and 8 illustrate examples of a method of recognizing an object.

FIG. 7 illustrates an example of a method of recognizing an object. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, a recognition apparatus acquires an input image from a camera or an image sensor. In operation 730, the recognition apparatus acquires vehicle control information from a sensor. In an example, the recognition apparatus acquires vehicle control information corresponding to a time at which the input image is acquired. The vehicle control information may be acquired at different times, such as, for example, before or after the input image is acquired, without departing from the spirit and scope of the illustrative examples described.

In operation 720, the recognition apparatus determines whether a blur is detected in the input image. When it is determined that the blur is not detected in operation 720, the recognition apparatus detects and recognizes an object from the input image in operation 780.

When it is determined that the blur is detected in operation 720, the recognition apparatus determines a blur type in operation 740 based on the vehicle control information acquired in operation 730.

In operation 750, the recognition apparatus determines whether the determined blur type is a first blur type. When it is determined that the blur type is the first blur type in operation 750, the recognition apparatus de-blurs the input image using a motion filter in operation 760.

When it is determined that the blur type is not the first blur type (for example, is a second blur type) in operation 750, the recognition apparatus de-blurs the input image using a de-focusing filter in operation 770.

In operation 780, the recognition apparatus detects and recognizes an object from the de-blurred input image.

Figure 8:
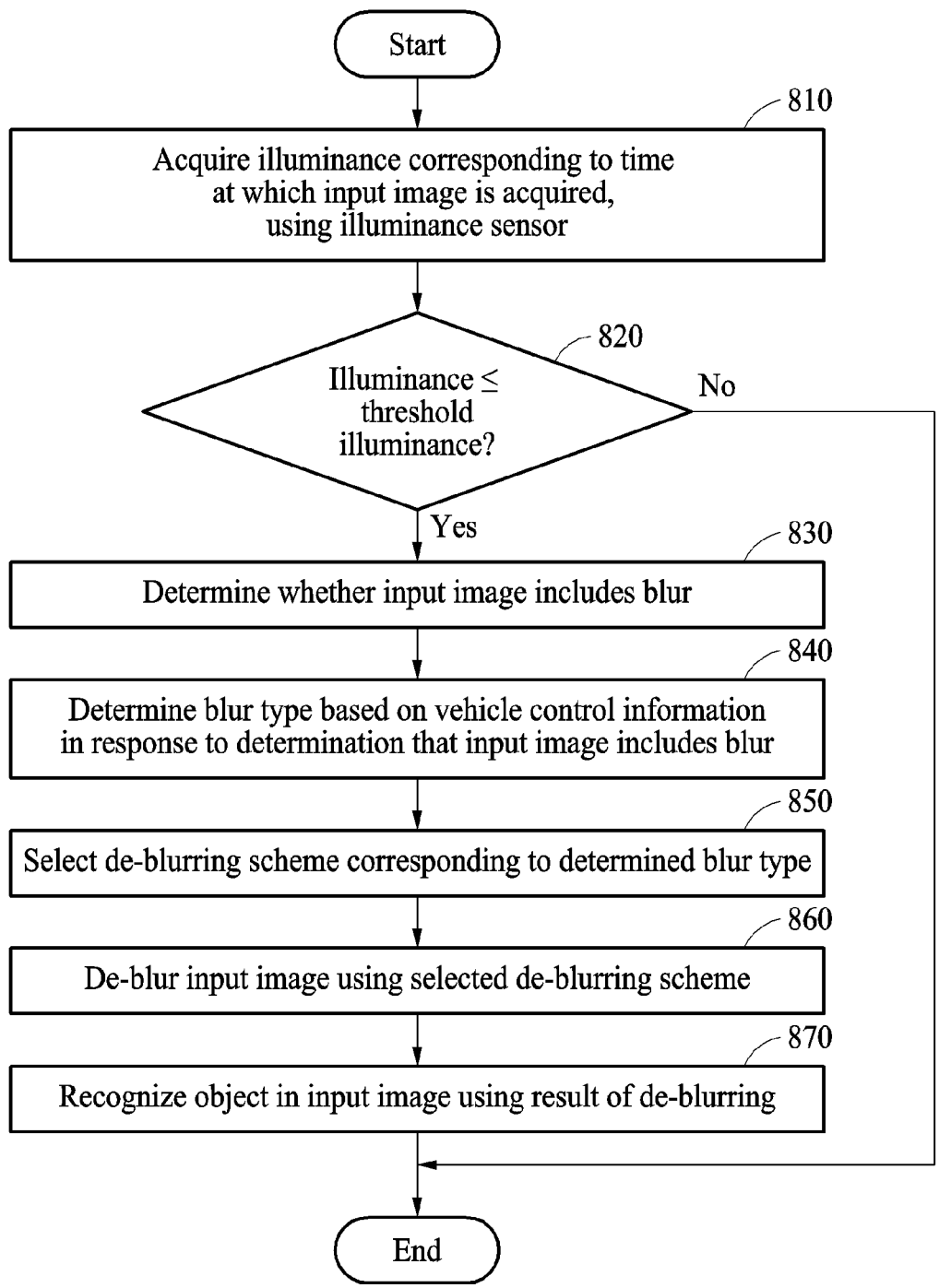

FIG. 8 illustrates an example of a method of recognizing an object. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, a recognition apparatus acquires an illuminance corresponding to a time at which an input image is acquired, using an illuminance sensor. The recognition apparatus determines whether the input image includes a blur based on the illuminance corresponding to the time at which the input image is acquired. In operation 820, the recognition apparatus determines whether the illuminance is less than a threshold illuminance. The threshold illuminance is, for example, 10 Lux. The recognition apparatus may apply the aforementioned method of recognizing an object to an input image captured at a low illuminance such as at night or on a cloudy day in accordance with an example. The recognition apparatus determines whether the input image is acquired at night or on a cloudy day by comparing the illuminance corresponding to the time at which the input image is acquired to the threshold illuminance. When the illuminance is determined to be greater than or equal to the threshold illuminance in operation 820, the recognition apparatus terminates an operation.

When the illuminance is determined to be less than the threshold illuminance in operation 820, the recognition apparatus determines whether the input image includes a blur in operation 830. Since the description of operations 210 through 250 of FIG. 2 is also applicable to operations 830 through 870 of FIG. 8, repeated description will be omitted for brevity.

Figure 9:
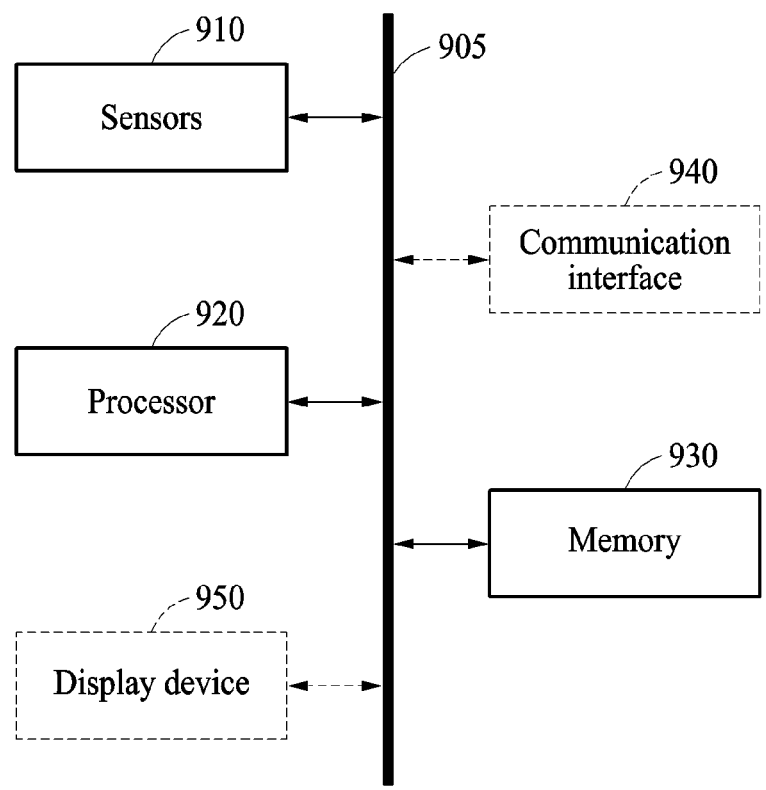
FIG. 9 illustrates an example of an apparatus for recognizing an object.

FIG. 9 illustrates an example of an apparatus for recognizing an object. Referring to FIG. 9, a recognition apparatus 900 includes a processor 920. The recognition apparatus 900 also includes the sensors 910, a memory 930, a communication interface 940, and a display device 950.

The sensors 910, the processor 920, the memory 930, the communication interface 940, and the display device 950 communicate with one another through a communication bus 905. The sensors 910 include sensors such as, for example, an image sensor, an accelerometer sensor, an odometer, a gyro sensor, a LiDAR, a RADAR, and an IMU sensor. The sensors 910 sense or acquire vehicle control information. The vehicle control information includes, for example, a steering angle of a vehicle, a speed of the vehicle, whether brakes have been activated, whether gears have been changed, and whether a left or right turn indicator of the vehicle is being used. In an example, the sensors 910 also include an illuminance sensor. The illuminance sensor acquires an illuminance corresponding to a time at which the input image is acquired.

The recognition apparatus 900 receives sensing information of the sensors 910 through the communication interface 940. The communication interface 940 receives an input image and sensing information from an external source of the recognition apparatus 900.

The processor 920 determines whether an input image includes a blur. The processor 920 determines a blur type of the blur based on the vehicle control information when the input image includes the blur. In an example, the processor 920 determines whether the blur corresponds to a first blur type or a second blur type based on the vehicle control information.

In an example, the processor 920 selects a de-blurring scheme corresponding to the determined blur type and de-blurs the input image using the selected de-blurring scheme. The processor 920 recognizes an object from the de-blurred input image.

In an example, the processor 920 determines whether the input image includes the blur based on a clearness of an edge portion of the input image. In an example, the processor 920 divides the input image into partial images and calculates a gradient magnitude value corresponding to each of the partial images. In an example, the processor 920 determines whether the input image includes the blur based a comparison between the gradient magnitude value and a threshold.

In an example, the processor 920 determines a blur type of the blur based on any one or any combination of whether a steering angle of the vehicle is greater than or equal to a first threshold, whether a speed of the vehicle is greater than or equal to a second threshold, and whether a left or right turn indicator of the vehicle is being used. The processor 920 selects a de-blurring scheme using a first filter when the blur is determined to correspond to a first blur type, and selects a de-blurring scheme using a second filter when the blur is determined to correspond to a second blur type.

In an example, the processor 920 determines whether the input image includes the blur based on the illuminance corresponding to the time at which the input image is acquired.

The processor 920 performs at least one of the methods described with reference to FIGS. 1 through 8 or an algorithm corresponding to at least one of the methods. The term 'processor,' as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA). The processor 920 executes a program and controls the recognition apparatus 900. Codes of the program executed by the processor 920 are stored in the memory 930. Further details of the processor 920 are described below.

The memory 930 stores an image acquired by an image sensor. The memory 930 stores an input image in which a blur is processed by the processor 920 and/or an object recognized in the input image. The memory 930 stores various information generated during a processing operation of the processor 920. Also, the memory 930 includes a variety of data and programs. The memory 920 includes a volatile memory or a non-volatile memory. The memory 920 includes a large-capacity storage medium such as a hard disk to store the variety of data. Further details of the memory 920 are described below.

The display device 950 displays the input image in which a blur is processed by the processor 920 and/or the object recognized in the input image. In an example, the display 950 is a physical structure that includes one or more hardware components that provide the ability to render a user interface and/or receive user input. In an example, the display 950 can be embedded in the object positioning apparatus 901. In an example, the display 950 is an external peripheral device that may be attached to and detached from the recognition apparatus 900. The display 950 may be a single-screen or a multi-screen display. In an example, the processor 920 projects the recognized object to a wind shield glass or a separate screen of the vehicle using a head-up display (HUD). However, the displaying of the object is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the recognition apparatus 900 may be used without departing from the spirit and scope of the illustrative examples described.

The recognition apparatus 900, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-3 and 5-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of recognizing an object. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of recognizing an object included in an image captured by a vehicle, the method comprising:
    determining whether the image comprises a blur;
    determining a blur type of the blur based on control information, which represents a movement of the vehicle, in response to the image comprising the blur;
    selecting a de-blurring scheme corresponding to the determined blur type;
    de-blurring the image using the selected de-blurring scheme; and
    recognizing an object in the image based the de-blurred image,
    wherein the determining of the blur type comprises determining whether the blur corresponds to a first blur type or a second blur type based on any one or any combination of whether a steering angle of the vehicle is greater than or equal to a first threshold, whether a speed of the vehicle is greater than or equal to a second threshold, and whether a turn indicator of the vehicle is operated.

2. The method of claim 1, wherein the determining of whether the image comprises the blur comprises:
    determining whether the image comprises the blur based on a clearness of an edge portion of the image.

3. The method of claim 1, wherein the determining of whether the image comprises the blur comprises:
    dividing the image into partial images;
    calculating a gradient magnitude value corresponding to each of the partial images; and
    determining whether the image comprises the blur based on a comparison of the gradient magnitude value and a threshold.

4. The method of claim 1, wherein the control information comprises any one or any combination of the steering angle of the vehicle, the speed of the vehicle, and whether the turn indicator of the vehicle is operated.

5. The method of claim 1, wherein the control information is acquired by any one or any combination of an odometer, a gyro sensor, a radio detection and ranging (RADAR), a light detection and ranging (LiDAR), an inertial measurement unit (IMU) sensor, and an acceleration sensor.

6. The method of claim 1, wherein the selecting of the de-blurring scheme comprises:
    selecting a de-blurring scheme using a first filter in response to the blur corresponding to the first blur type; and
    selecting a de-blurring scheme using a second filter in response to the blur corresponding to the second blur type.

7. The method of claim 1, further comprising:
    acquiring an illuminance, using an illuminance sensor, at a time when the image is acquired,
    wherein the determining of whether the image comprises the blur comprises determining whether the image comprises the blur based on the illuminance.

8. A non-transitory computer-readable storage medium storing instructions that, when executed by a processor, cause the processor to perform the method of claim 1.

9. An apparatus for recognizing an object included in an image captured by a vehicle, the apparatus comprising:
    a processor configured to
        determine whether the image comprises a blur,
        determine a blur type of the blur based on control information, which represents a movement of the vehicle in response to the image comprising the blur,
        select a de-blurring scheme corresponding to the determined blur type,
        de-blur the image using the selected de-blurring scheme, and
        recognize an object in the image based on the de-blurred image,
        wherein the processor is further configured to determine whether the blur corresponds to a first blur type or a second blur type based on any one or any combination of whether a steering angle of the vehicle is greater than or equal to a first threshold, whether a speed of the vehicle is greater than or equal to a second threshold, and whether a turn indicator of the vehicle is operated.

10. The apparatus of claim 9, wherein the processor is further configured to determine whether the image comprises the blur based on a clearness of an edge portion of the image.

11. The apparatus of claim 9, wherein the processor is further configured to divide the image into partial images, to calculate a gradient magnitude value corresponding to each of the partial images, and to determine whether the image comprises the blur based on a comparison of the gradient magnitude value and a threshold.

12. The apparatus of claim 9, wherein the control information comprises any one or any combination of the steering angle of the vehicle, the speed of the vehicle, and whether the turn indicator of the vehicle is operated.

13. The apparatus of claim 9, wherein the control information is acquired by any one or any combination of an odometer, a gyro sensor, a radio detection and ranging (RADAR), a light detection and ranging (LiDAR), an inertial measurement unit (IMU) sensor, and an acceleration sensor.

14. The apparatus of claim 9, wherein the processor is further configured to select a de-blurring scheme using a first filter in response to the blur being determined to correspond to the first blur type and to select a de-blurring scheme using a second filter in response to the blur being determined to correspond to the second blur type.

15. The apparatus of claim 9, further comprising:
an illuminance sensor configured to acquire an illuminance at a time when the image is acquired,
wherein the processor is further configured to determine whether the image comprises the blur based on the illuminance.

* * * * *